United States Patent [19]

Bittel

[11] Patent Number: 4,968,922

[45] Date of Patent: Nov. 6, 1990

[54] REVERSING SWITCH

[75] Inventor: Robert W. Bittel, Parma Heights, Ohio

[73] Assignee: Lucerne Products, Inc., Hudson, Ohio

[21] Appl. No.: 339,064

[22] Filed: Apr. 17, 1989

Related U.S. Application Data

[62] Division of Ser. No. 182,158, Apr. 15, 1988, Pat. No. 4,864,083.

[51] Int. Cl.[5] .......................... H01H 9/00; H02P 1/22

[52] U.S. Cl. .................................... 318/280; 318/293; 310/50; 200/5 R; 200/243; 200/290; 200/505; 200/522

[58] Field of Search ............... 318/255, 256, 268, 280, 318/293; 200/5 R, 5 A, 175, 176, 6 R, 6 A, 7, 9, 42.01, 51.05, 51.07, 505, 522, 564, 567, 570, 243, 271, 273, 290, 1 V, 51 R, 61.85; 310/47, 50, 68 A, 68 R; 81/469

[56] References Cited

U.S. PATENT DOCUMENTS

| | | | |
|---|---|---|---|
| 1,399,411 | 12/1921 | Stechbart . | |
| 2,478,690 | 8/1949 | Furnas et al. . | |
| 3,579,002 | 5/1971 | Wickham | 200/522 X |
| 3,637,967 | 1/1972 | Braun . | |
| 3,649,780 | 3/1972 | Johnson . | |
| 3,691,322 | 9/1972 | Matthews . | |
| 3,703,646 | 11/1972 | Jacyno | 200/522 X |
| 3,742,364 | 6/1973 | Matthews . | |
| 3,748,557 | 7/1973 | Mittelstredt | 318/293 X |
| 3,755,640 | 8/1973 | Kaman et al. . | |
| 4,204,580 | 5/1980 | Nalley | 200/522 X |
| 4,277,661 | 7/1981 | Riess | 200/522 |
| 4,348,603 | 9/1982 | Huber | 200/522 X |
| 4,396,811 | 8/1983 | Kijucaricek . | |
| 4,450,323 | 5/1984 | Iitsuka . | |
| 4,588,910 | 5/1986 | Bausch | 200/522 X |
| 4,660,019 | 4/1987 | Bauer et al. | 200/522 X |
| 4,665,290 | 5/1987 | Piber | 200/522 X |
| 4,678,871 | 7/1987 | Wong . | |
| 4,847,451 | 7/1989 | Nagata | 200/522 X |

*Primary Examiner*—Bentsu Ro

*Attorney, Agent, or Firm*—D. Peter Hochberg; Mark Kusner; Louis J. Weisz

[57] ABSTRACT

In accordance with the present invention, there is provided an electric reversing switch comprising an insulated base having an elongated cavity defined therein. An elongated insulation member is provided for oscillatory motion about an axis through the cavity through an angular interval between a first and second position. Conductive bridging elements are provided on the ends of the insulation member and biased outwardly from the insulation member along the axis thereof. A first pair comprising first and second fixed contacts is supported in the base, each including a contact portion within the cavity and being symmetrical disposed relative to the axis through the cavity. A second pair comprising third and fourth fixed contacts is provided within the housing, each including contact portions within the cavity wherein one contact portion is adjacent and spaced angularly from the contact portion of the first fixed contact and another contact portion is adjacent and spaced angularly from the contacting portion of the second fixed contact. Means are provided for oscillating the insulation member between a first position wherein the bridging element at one end of the insulation member electrically connects the contact portions of the first and third fixed contacts and the bridging element at the other end of the insulation member electrically connects the contact portions fo the second and fourth fixed contacts, and a second position wherein the bridging elements electrically connct the first fixed contact with the fourth fixed contact, and the second fixed contact with a third fixed contact.

14 Claims, 4 Drawing Sheets

MATCH TO FIG. 3B

MATCH TO FIG. 3A

MATCH TO FIG. 3A

REVERSING SWITCH

This is a divisional of co-pending application Ser. No. 182,158 filed on Apr. 15, 1988, now U.S. Pat. No. 4,864,083.

FIELD OF THE INVENTION

The present invention relates to electric switches, and more particularly to a compact electrical reversing switch for a power tool, utensil or other motor driven device. The invention is particularly applicable to a compact D.C. reversing switch for reversing the direction of rotation of an electric motor of a hand-held, cordless power tool and will be described with particular reference thereto, although it will be understood that the present invention finds advantageous application in other switching operations.

BACKGROUND OF THE INVENTION

The present invention relates generally to a compact reversing switch of the type disclosed in U.S. Pat. No. 3,691,322, issued Sept. 12, 1972 to Benjamin H. Mathews, entitled "Reversing Switch". The patent discloses a two position reversing switch comprised of a relatively stationary body segment having a plurality of stationary contacts mounted thereon and a rotary segment having a plurality of contacts mounted thereon for rotation therewith. The rotary segment is rotatable about an axis through the stationary body segment for moving the contact elements into several operative positions wherein the contacts of the rotary segment engage several of the contacts of the stationary body segment in a predetermined pattern to conductively bridge several of the stationary contacts. The direction of current flow through the switch may be reversed, depending on the position on the rotary contacts with respect to the stationary contacts. A lever means is mounted on the switch housing and coacts with the rotary segment for moving the rotary contacts to one or the other of its operative positions.

The disclosed switch has proved to be extremely dependable when used in reversible hand-held power tools operable on A.C. power. Recent developments in rechargeable batteries however have led to a greater demand for cordless power tools which are operable by rechargeable D.C. battery packs. Unlike standard A.C. current, these rechargeable D.C. battery packs operate at relatively low voltage/high current levels. In this respect, the aforementioned compact reversing switch, and others like it, which were suitable for use with high voltage/low current A.C. power, simply do not have the capacity to handle the higher amperage of these new D.C. battery packs. One problem is that such switches include relatively small, delicate contact members which produce substantial resistance to current flow. For example, a typical switch known heretofore would exhibit a resistance of over 200 milliohms thereacross. Such resistance reduces current flow, and would generate substantial heat within the switch if used with a high-amperage D.C. power source. Moreover, with high amperage, arcing between the contacts also becomes a substantial problem for switches known heretofore.

The present invention overcomes these and other problems and provides a compact reversing switch having relatively massive electrically conductive contact members. These members are dimensioned to conduct high current levels with minimal electrical resistance, dissipate heat from the switch, and provide a conducting neutral position. In addition, the switch includes relatively few parts, and these are easy to manufacture and assemble.

SUMMARY OF THE INVENTION

The present invention provides a novel, highly compact reversing mechanism which finds advantageous application in the environmental setting of the aforementioned switch mechanism of U.S. Pat. No. 3,691,322, as well as in low voltage/high amperage environmental settings for accomplishing reversal of a motor drive.

In accordance with the present invention, there is provided an electric reversing switch comprising an insulated base having an elongated cavity defined therein. An elongated insulation member is provided for oscillatory motion about an axis through the cavity through an angular interval between first and second positions. Conductive bridging elements are provided on the ends of the insulation member and biased outwardly from the insulation member along the longitudinal axis thereof. A first pair of contacts comprising first and second fixed contacts is supported in the base, each of the fixed contacts including a contact portion within the cavity which is symmetrically disposed relative to the axis through cavity. A second pair comprising third and fourth fixed contacts is provided within the housing; each of these fixed contacts includes two contact portions within the cavity wherein one contact portion is adjacent and spaced angularly from the contact portion of the first fixed contact and the other contact portion is adjacent and spaced angularly from the contact portion of the second fixed contact. Means are provided for oscillating the insulation member between a first position wherein the bridging element at one end of the insulation member electrically connects the contact portions of the first and third fixed contacts and the bridging element at the other end of the insulation member electrically connects the contact portions of the second and fourth fixed contacts, and a second position wherein the bridging elements electrically connect the first fixed contact with the fourth fixed contact, and the second fixed contact with a third fixed contact.

In accordance with another aspect of the present invention there is provided a switch as defined above wherein the switch includes a third neutral position wherein the conductive bridging elements mounted on the ends of the insulation member engage only the contact portions of the first pair of fixed contacts.

In accordance with another aspect of the present invention, there is provided an electric reversing switch as defined above wherein each of the fixed contacts includes a connector portion external to the base of the switch.

In accordance with another aspect of the present invention, there is provided a compact trigger switch assembly for controlling the operation of an electric motor, which trigger switch assembly incorporates the reversing switch defined above.

In accordance with a still further aspect of the present invention, there is provided a compact trigger switch assembly for controlling the operation of an electric motor. The trigger switch assembly includes an insulated housing having motor control switch means therein. A trigger assembly is connected to the motor control switch means and a reversing switch is provided within the housing for reversing the direction of operation of the electric motor. An elongated lever is connected to the reversing switch to control the position thereof. The lever is formed to include a pivot pin integral therewith, which pin is received in the housing in snap-lock fashion, wherein said lever pivots about the axis of the pin to control the position of the reversing switch.

It is an object of the present invention to provide a compact, electrical reversing switch for use with an electric motor for reversing the direction thereof.

Another object of the present invention is to provide a compact, electrical reversing switch of the type described above wherein such switch is readily adapted for mounting on the body of a trigger-actuated switch, the latter being of the type integrated within the housing of a portable electric tool.

Another object of the present invention is to provide a compact, electrical reversing switch of the type described above which is suitable for use in hand-held, cordless power tools using low voltage/high amperage rechargeable batteries.

A further object of the present invention is to provide a compact, electrical reversing switch as described above which has a non-conducting neutral position wherein current does not pass therethrough.

A further object of the present invention is to provide a compact, electrical reversing switch as described above which reduces power loss through the switch by reducing the electrical resistance thereacross.

A still further object of the present invention is to provide a compact, electrical reversing switch of the type described above wherein such switch includes three pairs of contact members, the contacts of each pair being identical.

A still further object of the present invention is to provide a compact, electrical reversing switch of the type described above wherein the contact members are adapted to dissipate heat from the switch.

A still further object of the present invention is to provide a compact, electrical reversing switch of the type described above which may be readily integrated with a speed control circuit for an electric motor of a power tool.

A still further object of the present invention is to provide a compact, electrical reversing switch of the type described above which switch includes relatively few parts which are easy to manufacture and assemble.

These and other objects and advantages will become apparent from the following description of a preferred embodiments of the invention taken together with the accompanying drawings.

DRAWINGS

The invention might take physical form in certain parts and arrangement of parts, an embodiment of which is described in detail in the specification and illustrated in the accompanying drawing wherein.

DETAILED DESCRIPTION OF THE PREFERRED EMBODIMENT

Figure 1:
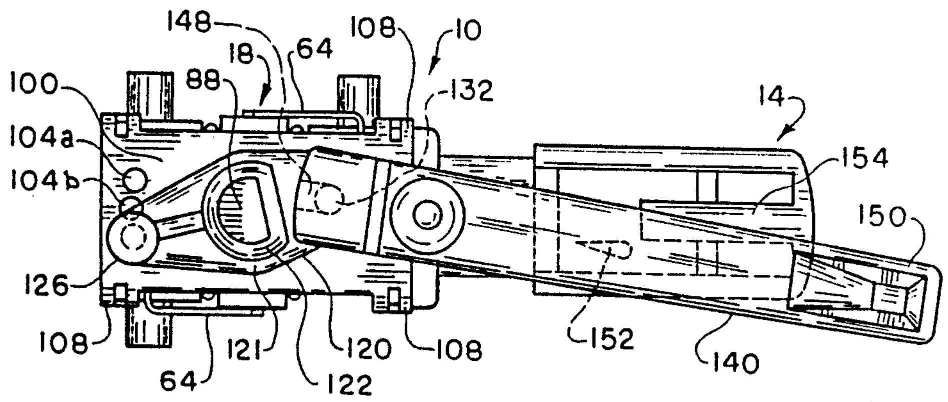
FIG. 1 is a top, plan view of a trigger switch assembly illustrating a preferred embodiment of the present invention.
Figure 2:
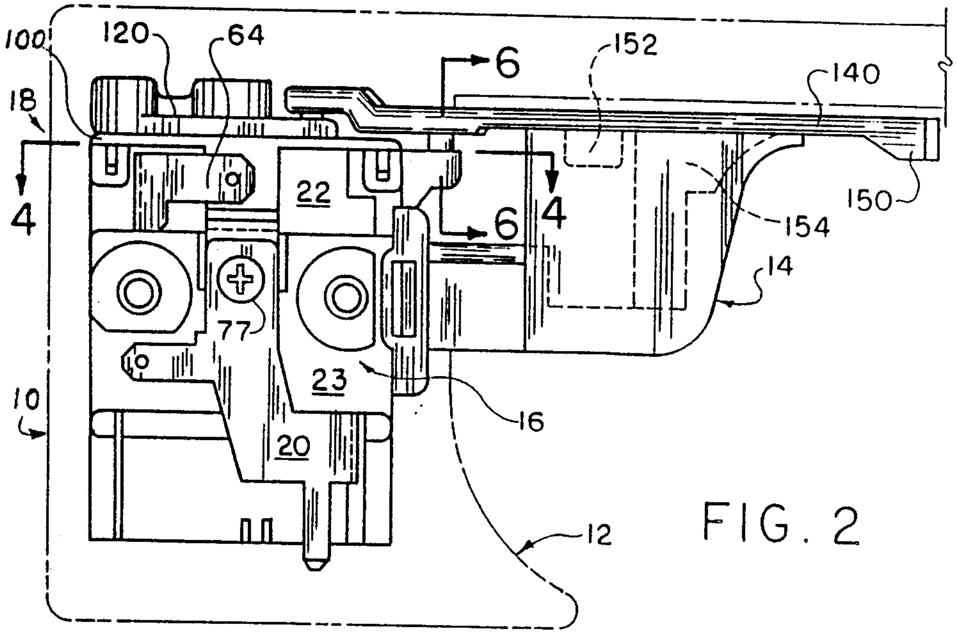
FIG. 2 is a side, elevational view of the trigger switch assembly shown in FIG. 1.

Referring now to the drawings wherein the showings are for the purpose of illustrating a preferred embodiment of the invention, and not for the purpose of limiting same, FIGS. 1 and 2 illustrate a trigger switch assembly 10 for use in a power tool. The tool may be of a portable type which includes a depending pistol, grip-like handle 12 having trigger switch assembly 10 mounted thereon, which switch 10 is adapted to control the operation of an electric motor (not shown), such as, for instance, a universal electric motor within the tool. A trigger 14 of the reciprocal spring loaded type is preferably provided to coact with a speed control switch unit 16 provided to control the speed of the electric motor in a conventionally known manner. Trigger switch assembly 10 may also include a locking mechanism (not shown) including a reciprocal pin for locking trigger 14 in its full inward or maximum "on" position. Speed control switch unit 16 is preferably of the type which varies the speed of an electric motor proportionally in accordance with the inward movement of the trigger 14 from a completely outward or "off" position to a completely inward or "on" position. However, speed control switch unit 16 may be of the "one/off" type which activates the electric motor when trigger 14 is squeezed beyond a predetermined position, or it may be of a type having two or more distinct speed settings actuated by incremental displacement of trigger 14. In this respect, speed control switch unit 16 in and of itself forms no part of the present invention, and therefore will not be described in great detail. It will be understood, however, that in the embodiment shown, trigger switch assembly 10 includes trigger 14, a speed control switch unit 16 and a reversing switch mechanism 18 with which the present invention is particularly concerned, with such trigger switch assembly 10 being of integral, compact construction for ready installation in a tool, appliance or the like. Electrical leads 20 may extend from the trigger switch assembly 10 and form part of an electrical power circuit in a conventional manner.

Figure 3A:
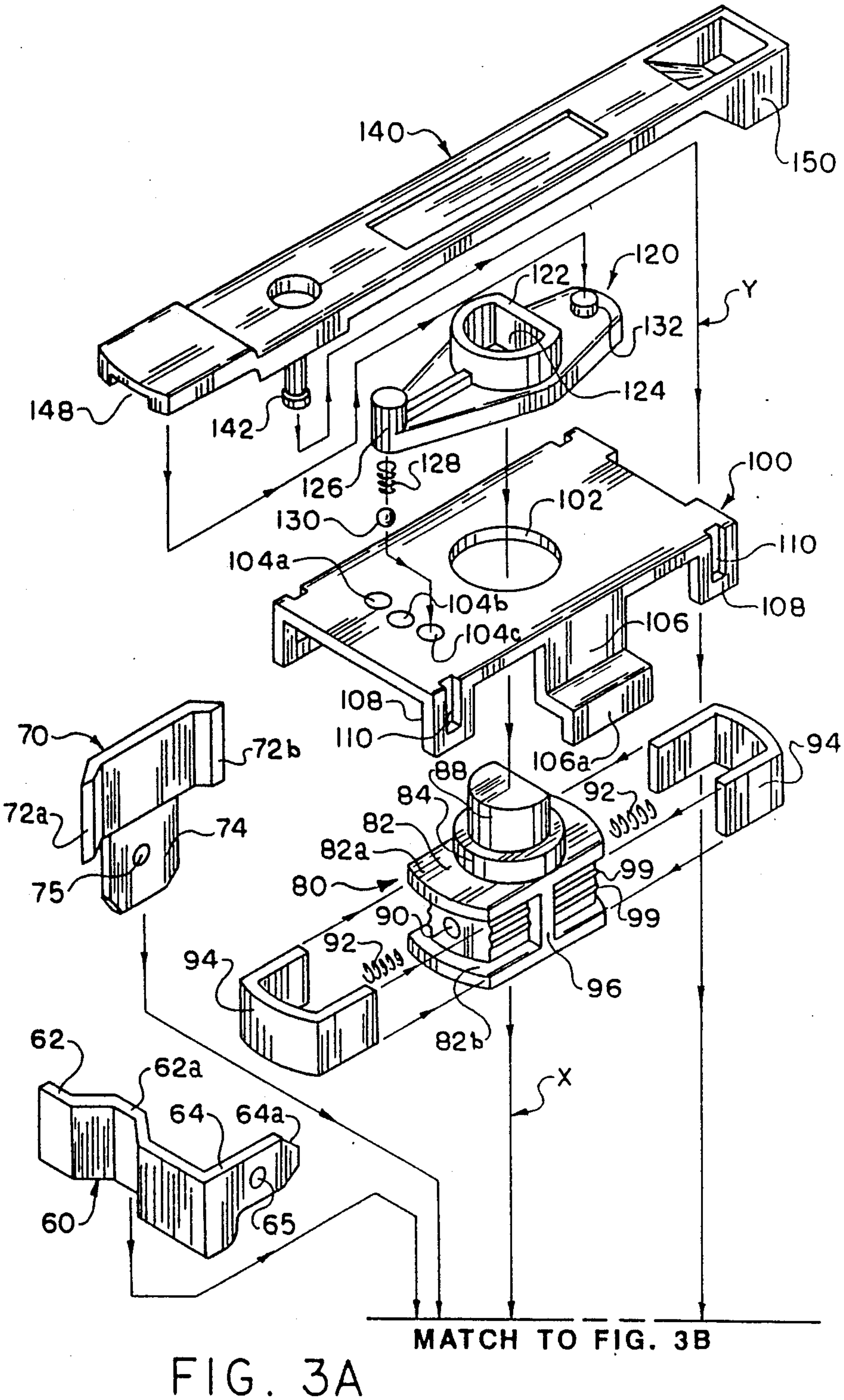
FIGS. 3A and 3B are enlarged exploded, perspective view of the reversing switch portion of the trigger switch assembly shown in FIG. 1 illustrating a preferred embodiment of the present invention.
Figure 3B:
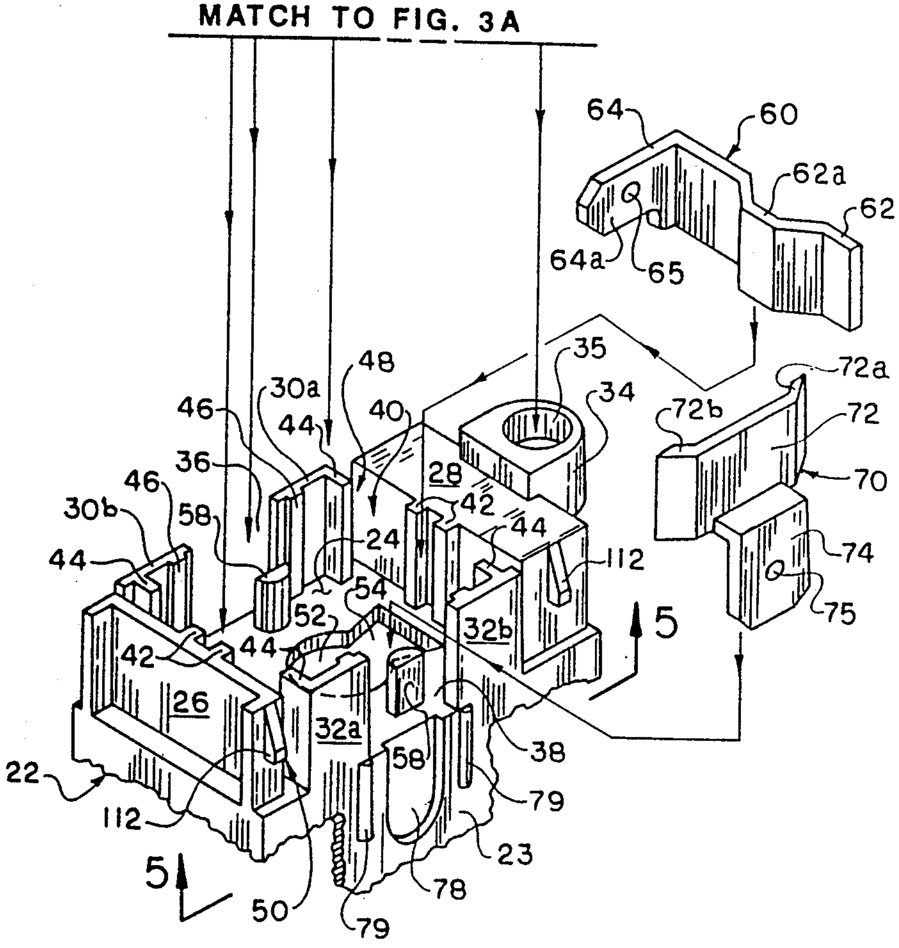
Figure 5:
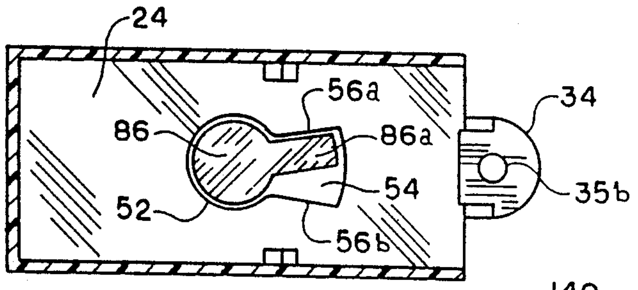
FIG. 5 is a view taken along line 5—5 of FIG. 3.
Figure 6:
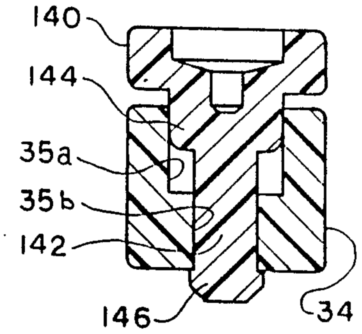
FIG. 6 is an enlarged sectional view taken along line 6—6 of FIG. 2.

Reversing switch mechanism 18 includes a housing 22 formed of any suitable non-conductive material, such as, for instance, moldable plastic material. In the embodiment shown, housing 22 is secured to, molded or otherwise formed integrally with a casing 23 enclosing speed control switch unit 16 and the remainder of trigger switch assembly 10. A partition wall 24 (best seen in FIG. 3) forms the bottom of housing 22 and generally separates speed control switch unit 16 from reversing switch mechanism 18. Referring now to FIG. 3, housing 22 is generally rectangular in shape and includes end wall sections 26, 28, and side wall sections **30*a*, 30*b*, 32*a* and 32*b*. End wall section 28 includes a laterally extending generally cylindrical platform 34 having a cylindrical opening 35 therethrough. Opening 35 includes an upper section 35*a* and a lower section 35*b* of substantially smaller diameter, as best seen in FIG. 6. Side wall sections 30*a*, 30*b* and 32*a*, 32*b* define gaps or openings 36, 38 respectively, which gaps 36, 38 have a predetermined width and communicate an interior cavity 40** which is defined by the respective wall sections with the exterior of housing 26. Inwardly extending locating ribs 42 are provided on end wall sections 26, 28, and locating ribs 44 are provided on side wall sections 30*a*, 30*b*, 32*a* and 32*b*. Side wall sections 30*a*, 30*b*, 32*a* and 32*b* also include spacer ribs 46 thereon. Narrow throat portions or passages 48, 50 are defined between end wall sections 26, 28 and side wall sections 30*a* and 32*a*. Referring now to partition wall 24, a centrally located bearing opening 52 best seen in FIG. 5 is provided therethrough. Bearing opening 52 is aligned along an axis designated X through housing 22. Bearing opening 52 includes a laterally extending recess 54 having angularly spaced straight side walls 56*a* and 56*b*. Side walls 56*a* and 56*b* are oriented at a predetermined angle relative to the longitudinal axis of housing 22. In the preferred embodiment, side walls 56*a* and 56*b* each define a $13\frac{1}{2}°$ angle relative to the longitudinal axis of housing 22. On each side of bearing opening 52, a post 58 is provided. Posts 58 are symmetrically disposed relative to axis X and are spaced at predetermined distance from openings or gaps 36, 38.

Figure 4:
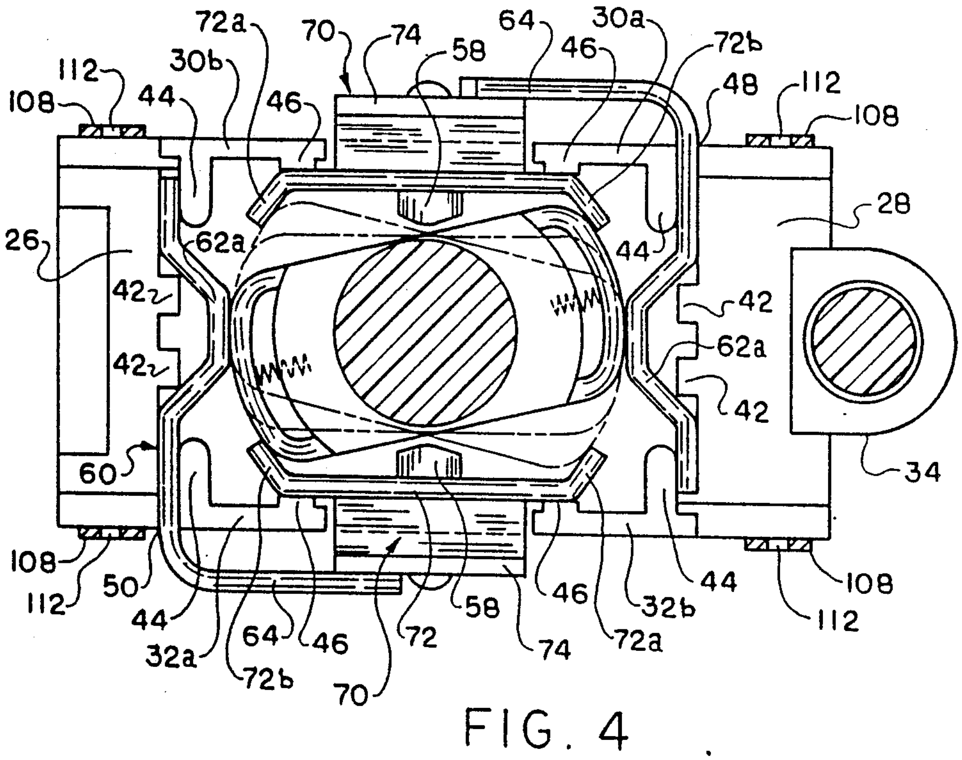
FIG. 4 is an enlarged sectional view taken along line 4—4 of FIG. 2.

Reversing switch mechanism 18 includes two pairs of relatively fixed or stationary contacts, the contacts of each pair being substantially identical to each other. One pair is comprised of fixed contacts 60, which are located adjacent end wall sections 26, 28. As best seen in FIG. 3, fixed contact 60 are generally L-shaped having a major leg 62 having a dentation 62*a* therein forming a contact portion, and a minor leg 64 having a notched end 64*a* forming a connector portion. Connector portion 64 is preferably dimensioned to receive a standard quick connect fastener. Connector portion 64 however may also include an aperture 65 therethrough to facilitate a fastening screw (not shown) by which a bare lead wire can be secured to the contact 60. In this respect, aperture 65 may include screw threads therein or be dimensioned to accept a self-tapping screw. Fixed contacts 60 are positioned within housing 22 such that respective dentations or contact portions 62 are symmetrically disposed relative to axis X as seen in FIG. 4. Legs 62 of respective contacts 60 extend through throat portions 48, 50 of housing 22 such that leg 64 and the connector portions 64*a* are disposed externally of housing 22. The spacing defined between end wall sections 26, 28 and side wall sections 30*a*, 30*b* and 32*a*, 32*b* are dimensioned to snugly receive contacts 60 therein and to maintain contacts 60 stationary relative to housing 22.

The second pair of fixed contacts is comprised of contacts 70 which are located adjacent side wall sections 30*a*, 30*b*, 32*a* and 32*b*. As seen in FIG. 3, fixed contacts 70 are generally T-shaped, each having an upper leg 72 and a lower leg 74 perpendicular thereto. The ends of upper leg 72 are crimped or curved to form contact portions 72*a*, 72*b*. As best seen in the lower right hand corner of FIG. 3, lower leg portion 74 is offset from upper leg portion 72. Lower leg portion 74 defines the connector portion of contact 70. Fixed contacts 70 are positioned within housing 22 as best seen in FIG. 4, wherein upper leg 72 is received within the opening defined between post 58 and spacer ribs 46 on wall sections 30*a*, 30*b*, 32*a* and 32*b*. In this respect, lower leg portion 74 extends through gaps 36, 38 in side wall sections 30*a*, 30*b*, 32*a* and 32*b* to position lower leg portion 74 outside of housing 22. In this orientation, contact portions 72*a* and 72*b* are angularly disposed relative to contact portions 62*a* of fixed contacts 60. Lower leg portion 74 preferably includes an aperture 75 therethrough, which aperture 75 is preferably threaded to receive a fastening screw 77 shown in FIG. 2. Fastening screw 77 may be used to secure a lead 20 as shown in FIG. 2 or may be used to secure the bare end of a lead wire. In the embodiment shown, a U-shaped recess 78 (best seen in FIG. 3) is provided in casing 23 to facilitate fastener 77 extending through leg portion 74 of contact 70. External ribs 79 are provided along side recess 78 to position leg portion 74.

A rotary switch member 80 is dimensioned to be positioned within cavity 40 and to be in operative engagement with fixed contact members 60, 70. Rotary switch member 80 includes a generally obround insulation element 82 (the term obround meaning that element 82 has generally planar sides and rounded ends). Insulation element 82 includes an upper cylindrical pivot 84, a lower cylindrical pivot 86 (best seen in FIG. 5) and a shaft 88 extending along an axis centrally disposed relative to the ends of element 82 and coaxial with axis X. The lower or bottom cylindrical pivot 86 includes a generally rectangular arm 86*a* extending to one side thereof. Cylindrical pivot 86 and arm 86*a* are dimensioned to be received in bearing opening 52 and bearing opening recess 54 as shown in FIG. 5, wherein the size of cylindrical pivot 86 has been slightly reduced to more clearly illustrate the respective parts. Arm 86*a* and recess 54 are dimensioned and operable to limit angular rotation of insulation element 82 about axis X. In this respect, insulation element 82 can move only between the positions shown in FIG. 4. Aligned bores 90 extend along the longitudinal axis of obround insulation member 82. Each bore 90 receives a coiled compression spring 92. Generally U-shaped bridging contact members 94 are provided at the ends of insulation element 82. Bridging members 94 are formed of a metallic conductive material. A divider wall 96 is provided on each side of conductive element 82 to ensure that the ends of bridging contact members 94 do not come in contact with each other. Upper and lower flanges 82*a* and 82*b* are provided on insulation element 82 to confine vertically U-shaped bridging members 94. Longitudinal ribs 99 are provided along the sides of insulation element 82.

A generally planar cover 100 is provided to enclose cavity 40. Cover 100 includes a cylindrical bearing opening 102 to receive upper cylindrical pivot 84 of insulation member 82. Three depressions 104*a*, 104*b*, 104*c* which are angularly spaced from each other relative to bearing opening 102 are provided on the upper surface of cover 100. Cover 100 includes a pair of downward extending side walls 106 dimensioned to be received within the openings or gaps 36, 38 of housing 22. The lower ends 106*a* are dimensioned to overlie lower leg portion 74 of fixed contacts 70 when the fixed contact 70 are positioned within housing 22. Located at the corners of cover 100 are tabs 108, each having an opening 110 therethrough. Tabs 108 are positioned in registry with ledges or ramps 112 provided on the corners of housing 22, which ledges 112 snap respectively into openings 110 of tabs 108 when cover 100 is mounted on housing 22. In this respect, when cover 100 is snapped-locked onto housing 22, fixed contacts 60 and 70 are "locked" into position within housing 22, and rotary element 80 is aligned along axis X with upper cylindrical pivot 84 engaging bearing opening 102 of cover 100, and lower or bottom cylindrical pivot 86 engaging bearing opening 52 in partition wall 24.

Reversing switch mechanism 18 includes a link member 120 having a generally planar base 121 with a centrally located boss 122 thereon. Boss 122 includes an opening 124 which is configured to matingly engage, in press-fit fashion, shaft 88 of insulation element 82 to rotate with same about axis X. Link members 120 also includes a second boss 126 located at one end of base 121. Boss 126 includes a cylindrical bore (not shown) extending from the lower or bottom surface of base 121 to receive a coiled compression spring 128 therein. The bore and coiled compression spring 128 are adapted to be in registry with depressions 104*a*, 104*b*, 104*c* to bias a spherical member 130 into a selected one of the depressions based on the angular position of link 120 relative to axis X. A cylindrical pin 132 is provided on the other end of base 121.

Embracing pin 132 of link member 120 is the end of an elongated actuating or operating lever 140 which is pivotable about an axis Y through platform 34 on end wall section 28, which axis Y extends generally parallel to axis X. In this respect, the underside of actuating lever 140 is provided with a pivot pin 142 preferably integrally formed therewith. Pivot pin 142 (best seen in FIG. 6) includes an enlarged cylindrical bearing section 144 at its juncture with lever 140 and a flared end portion 146. Pivot pin 142 is received within opening 35 in platform 34 in snap lock fashion as seen in FIG. 6 wherein pin section 144 is disposed in opening 35*a*. One end of actuating lever 140 includes a slot 148 for receiving the aforementioned cylindrical pin 132 of link 120. The other end of operating lever 140 is provided with a tab portion 150 for convenient movement of operating lever 140 about axis Y by means of a user's finger. In this respect, rotation of operating lever 140 about pivot pin 142 is operative to rotate link 120 about axis X. The lower surface of operating lever 140 includes a downwardly extending projection 152, best seen in FIGS. 1 and 2. Projection 152 is operative to engage a wall member 154 on trigger 14 when operating lever 140 is aligned with the longitudinal axis of the switch assembly. In other words, when operating lever 140 is rotated to one side of wall member 154, trigger 14 is permitted to travel from its full "off" to its full "on" position. When operating lever 140 is positioned in its central position, projection 152 engages wall member 154 of trigger 14 and prevents activation thereof.

Referring now to the operation of the reversing switch mechanism 18, FIG. 1 illustrates operating lever 140 in an electrically conducting position. In this position, link 120 is oriented such that spherical member 130 is positioned in depression 104*c*. The corresponding position of insulation element 82 is shown in FIG. 4. In this respect, U-shaped bridging contact members 94 connect contact portions 62*a* of fixed contacts 60 with contact portions 72*g* of fixed contacts 70. As can be seen from the drawings, the longitudinal axis of insulation member 82 is positioned to one side of contact portion 62*a* (as indicated by the axially aligned compression springs 92). As a result, coiled compression springs 92 urge U-shaped bridging contact members 94 into positive engagement with the contact portions of the respective fixed contacts. Arm 86*a* on lower cylindrical pivot 86 limits movement of insulation element 82 to that shown in FIG. 4. Movement of operating lever 140 to the other side of trigger 14 causes link 120 to pivot rotary switch member 80 from the position shown in FIG. 4 to the position shown in phantom in the same figure. In this position, U-shaped bridging members 94 engage contact portion 62*a* of fixed contact 60 and contact portion 72*a* of fixed contacts 70, wherein the polarity of the switch has been reversed by contact of the U-shaped bridging contact members 94 with contact portions 62*a* of fixed contacts 60 and contact portions 72*a* of fixed contacts 70. A central, neutral position is also illustrated in phantom in FIG. 4. In this position, U-shaped conductive bridging members 94 engage only contact portion 62*a* of fixed contacts 60. This position is assumed when lever arm 140 is aligned relative to the direction of movement of trigger 14. Importantly, in this position, projection 152 restricts movement of trigger 14 to the full "on" position, as set forth above.

The present invention thus provides an extremely compact, three-position reversing switch which includes relatively few parts and yet is operable with high current/low voltage batteries. Importantly in this respect, the conductive members of the switch arrangement, i.e. contacts 60, 70 and U-shaped bridging contact members 94 are formed from relatively thick copper strips. In the embodiment shown, contacts 60, 70 and 94 are preferably die stamped from approximately 0.032 inch thick copper sheet and have a width of approximately 5/16 inch. In this respect, fixed contacts 60, 70 and U-shaped bridging contact member 94 provide a cross sectional area of approximately 0.008 square inches. This relatively large cross sectional area provides substantially increased current capacity than switches known heretofore. For instance, the cross sectional are of a contact in the reversing switch disclosed in aforementioned U.S. Pat. No. 3,691,322, is approximately 0.00063 square inches. As is apparent, a switch according to the present invention provides substantially more cross sectional area, which area increases the current conducting capacity of the switch and reduces resistance and heat.

Moreover, the relatively massive contact elements of the present invention provide a convenient heat sink to remove heat generated within the switch housing. In this respect, fixed contacts 60 and 70 each include a portion external of housing 22, i.e. legs 64 and 74 respectively. These external portions act as a heat sink to conduct heat, generated within the switch due to resistance and arcing between respective contact portions, to the external areas of the switch housing. Also important are the air spaces or gaps defined around fixed contact members 60 and 70. Spacer ribs 46 on side walls 30*a*, 30*b*, 32*a* and 32*b*, as well as ribs 98 on insulation element 82, produce air spaces surrounding the contact elements, which spaces reduce heat transfer to the housing 22 and likewise assist in dissipating heat from cavity 40. Accordingly, the present invention provides contact members which produce substantially increased current conduction, and at the same time act as heat sinks for dissipating heat from within the switch.

The present invention also comprises a trigger switch assembly 10 including a reversing switch of the afore-described type for reversing the direction of motor movement in conjunction with actuation of trigger 14 for controlling the electric motor. As set forth above, the trigger switch assembly 10 includes a speed control switch unit 16 for controlling the speed of the electric motor. The speed control switch unit 16 may be of a variable type, an "on/off" type, or of a type having two or more distinct motor speed levels. A trigger switch assembly 10 according to the present invention may include each of these types of speed control switches. Still further, another important aspect of a trigger switch assembly 10 according to the present invention is forming pivot pin 142 as an integral part of operating lever 140 and connecting operating lever 140 to housing 22 by means of a snap-lock connection. Heretofore metallic rivets or pins have been used to secure the operating lever to the switch housing. The present modification thus provides a simpler and less expensive fabrication and assembly of the switch unit.

The present invention has been described with respect to a preferred embodiment. Modifications and alterations will occur to others upon their reading and understanding of the specification. It is intended that all such modifications and alterations be included insofar as they come within the scope of the patent as claimed or the equivalent thereof.

Having thus described the invention, the following is claimed:

1. A compact trigger switch assembly for controlling the operation of an electric motor, said assembly comprising:

an insulated housing;

motor speed control switch means within said housing;

trigger assembly means connected to said motor speed control switch means for controlling the operation of said electric motor, said trigger assembly means including a trigger which is spring biased between a first position extending outwardly from said housing and a second position nearer said housing;

a three-position reversing switch within said housing for reversing the direction of operation of said electric motor, one of said three positions being an electrically non-conducting position, wherein said reversing switch includes two pairs of rigid, stationary contacts and an elongated insulation member disposed between said contacts which is oscillatory about an axis through said housing; and detent means disposed within said housing to bias said insulation member in at least three pre-determined angular positions.

2. A compact trigger switch assembly as defined in claim 1 further comprising lever means connected to said reversing switch for controlling the position thereof.

3. A compact switch assembly as defined in claim 2 wherein said lever means include means engaging movement thereof when said reversing switch is in said electrically non-conducting position.

4. A compact trigger switch assembly as defined in claim 2 wherein said lever means includes a pivot pin which is connected to said housing in snap-lock fashion.

5. A compact trigger switch assembly as defined in claim 1 wherein said motor speed control switch means is a variable speed switch.

6. A compact trigger switch assembly as defined in claim 1 wherein said motor speed control switch means is an on-off switch.

7. A compact trigger switch assembly as defined in claim 1 wherein said motor speed control switch means is a switch having two or more distinct speed settings.

8. A compact trigger switch assembly for controlling the operation of an electric motor, said assembly comprising:

an insulated housing;

motor speed control switch means within said housing;

trigger assembly means connected to said motor speed control switch means for controlling the operation of said electric motor, said trigger assembly means including a trigger which is spring biased between a first position extending outwardly from said housing and a second position nearer said housing; and a three-position reversing switch within said housing for reversing the direction of operation of said electric motor, one of said reversing the direction of operation of said electric motor, one of said three positions being an electrically non-conducting position, said reversing switch including:

an elongated insulation member oscillatory about an axis through said housing;

conductive bridging elements mounted on the ends of said insulation member;

a first pair of contacts comprising first and second fixed contacts supported in said housing adjacent opposite ends, each contact including a connector portion external to said housing and a contact portion within said housing symmetrically disposed relative to said axis;

a second pair of contacts comprising third and forth fixed contacts supported in said housing, each contact including a connector portion external to said housing and contact portions within said housing wherein one contact portion is adjacent and spaced angularly from said contact portion of said first fixed contact and another contact portion is adjacent and spaced angularly from said contact portion of said second fixed contact; and means for oscillating said insulation member between a first position wherein the bridging element at one end of the insulation member electrically connects the contact portions of said first and third fixed contacts and the bridging element at the other end of said insulation member electrically connects the contact portions of said second and fourth fixed contacts, and a second position wherein said bridging elements electrically connect said first fixed contact with said fourth fixed contact and said second fixed contact with said third fixed contact.

9. A compact trigger switch assembly as defined in claim 8 wherein said conductive bridging elements engage only said first and second fixed contacts when said switch is in said electrically non-conducting position.

10. A compact trigger switch assembly for controlling the operation of an electric motor, said assembly comprising:

an insulated housing;

motor speed control switch means within said housing;

trigger assembly means connected to said motor speed control switch means for controlling the operation of said electric motor, said trigger assembly means including a trigger which is spring biased between a first position extending outwardly from said housing and a second position nearer said housing; and a three-position switch within said housing having two pairs of rigid contacts and an elongated insulation member oscillatory about an axis through said housing, said insulation member being disposed between said pairs of rigid contracts and said contacts including portions external to said housing.

11. A compact trigger switch assembly as defined in claim 10 wherein said three-position switch is a reversing switch, wherein one position of said reversing switch is a non-conducting position.

12. A compact trigger switch assembly as defined in claim 10 wherein said contacts are die-stamped and have a thickness greater than 0.032 inches.

13. A compact trigger switch assembly for controlling the operation of an electric motor, said assembly comprising:

a insulated housing having a longitudinal axis therethrough;

motor speed control switch means within said housing;

trigger assembly means connected to said motor speed control switch means for controlling the operation of said electric motor, said trigger assembly means including a trigger which is spring biased between a first position extending outwardly from said housing and a second position nearer said housing; and a three-position switch within said housing having two pairs of stationary contacts and an elongated insulation member disposed between said contacts, said insulation member is oscillatory about an axis through said housing, wherein the angular movement of said insulation member about said axis is less than approximately 30°.

14. A compact trigger switch assembly as defined in claim 13 wherein said three-position switch is a reversing switch, wherein one position of said reversing switch is a non-conducting position.

* * * * *